United States Patent [19]

Ando et al.

[11] Patent Number: 5,222,245
[45] Date of Patent: Jun. 22, 1993

[54] GPS RECEIVER

[75] Inventors: Hitoshi Ando; Masashi Shimakata; Toshiaki Tsuchiya, all of Saitama, Japan

[73] Assignee: Pioneer Electronic Corporation, Tokyo, Japan

[21] Appl. No.: 668,822

[22] Filed: Mar. 13, 1991

[30] Foreign Application Priority Data

Mar. 20, 1990 [JP] Japan ................................. 2-68302

[51] Int. Cl.$^5$ ............................................. H04B 7/19
[52] U.S. Cl. .................. 455/13.2; 455/13.4; 455/343; 455/38.3; 342/357; 365/228; 371/66
[58] Field of Search ............... 455/9, 12.1, 13.2, 13.4, 455/38.3, 343; 364/143, 948.5; 365/228, 229; 371/66; 342/357

[56] References Cited

U.S. PATENT DOCUMENTS

| 4,426,712 | 1/1984 | Gorski-Popiel | 375/96 |
| 4,445,118 | 4/1984 | Taylor et al. | 343/357 |
| 4,458,307 | 7/1984 | McAnlis | 371/66 |
| 4,638,465 | 1/1987 | Rosini | 365/228 |
| 4,928,107 | 5/1990 | Kuroda | 342/357 |

FOREIGN PATENT DOCUMENTS 0353849 2/1990 European Pat. Off.

OTHER PUBLICATIONS

Patent Abstracts of Japan, vol. 13, No. 306 (P-897), Jul. 13, 1989 JPA-A-1 079 679 Toyota Central Res & Dev Lab, Inc.) Mar. 24, 1989.

Primary Examiner—Reinhard J. Eisenzopf
Assistant Examiner—Philip J. Sobutka
Attorney, Agent, or Firm—Sughrue, Mion, Zinn, Macpeak & Seas

[57] ABSTRACT

A GPS receiver includes a power supplying status detector for deriving a power-on or power-off signal by detecting a power supplying status of the GPS receiver, a clock for measuring time, a memory controller for controlling a nonvolatile memory upon receiving the power-off signal to store a time measured by the clock when the power is turned off or a time when the last ephemeris data is obtained and the last ephemeris data, and a position calculating circuitry for calculating the position of the user station upon receiving the power-on signal. A time duration is calculated from the time measured by the clock and the time stored in the nonvolatile memory. If it is determined that the measured time duration is shorter than a predetermined period of time, the positioning is performed based on the respective ephemeris data stored in the nonvolatile memory, whereas if it is determined that the measured time duration is no less than the predetermined period of time, the positioning is performed based on ephemeris data newly collected from the respective GPS satellites.

6 Claims, 3 Drawing Sheets

GPS RECEIVER

BACKGROUND OF THE INVENTION

This invention relates to radio navigation receivers, and more particularly to a radio receiver adapted for use with the Global Positioning System (GPS) navigation system wherein a present position of the user station is determined based on respective ephemeris data received from a plurality of satellites.

In conventional GPS receivers, a present position of the user station is calculated based on ephemeris data obtained from the GPS satellites by receiving satellite signals as is well known in the art.

In the conventional GPS receiver of this type, to perform the positioning with updated ephemeris data of GPS satellites, if the power supply has been turned off, each ephemeris data obtained from the GPS satellites has been lost at all times.

The operation of such a conventional GPS receiver will be described with reference to a flowchart shown in FIG. 1, wherein ST1–ST4 designate operational steps to be performed by the GPS receiver.

Upon initiation of the GPS receiver, it is checked whether or not a respective GPS satellite is acquired by the GPS receiver (step ST1). If it is, respective ephemeris data is collected (step ST2).

It is then checked whether or not the collection of respective ephemeris data from the GPS satellites has finished (step ST3). If it has, the program goes to a position calculating routine wherein the position calculation of the user station is initiated based on the collected ephemeris data (step ST4), whereas if it has not, step ST4 is repeated.

Accordingly, the present position of the user station can be calculated based on the collected ephemeris data. However, in accordance with the conventional GPS receiver, it has been required to collect the ephemeris data once again even if the power has been turned off for a short period of time. This in turn results in a problem of delaying the initiation of position calculation, since it takes a considerable time for the GPS receiver to re-collect the usable ephemeris data.

It is therefore an object of this invention to eliminate the problem encountered in the conventional GPS receiver and to provide a GPS receiver capable of initiating position calculation with no delay based on the ephemeris data being stored when the power has been turned off, if the power is turned on again within a predetermined period of time after the power outrage.

SUMMARY OF THE INVENTION

The present invention provides a GPS receiver comprising a power supplying status detector for deriving a power-on signal therefrom by detecting a power-on status of the GPS receiver and a power-off signal therefrom by detecting a power-off status of the GPS receiver, a clock section for measuring time, a memory control section for controlling a nonvolatile memory, upon receiving the power-off signal from the power supplying status detector, to store a time measured at the clock section when the power is turned off or a time when the last ephemeris data is obtained, and respective ephemeris data obtained in the last place, and a position calculating circuit for calculating the position of the user station upon receiving the power-on signal, wherein a time duration is calculated based on the time measured at the clock section and the time stored in the nonvolatile memory. If it is determined that the measured time duration is shorter than a predetermined period of time, the positioning is performed based on the respective ephemeris data stored in the nonvolatile memory, whereas if it is determined that the measured time duration is no less than the predetermined period of time, the positioning is performed based on respective ephemeris data newly collected from the respective GPS satellites.

DETAILED DESCRIPTION OF THE PREFERRED EMBODIMENT

Figure 1:
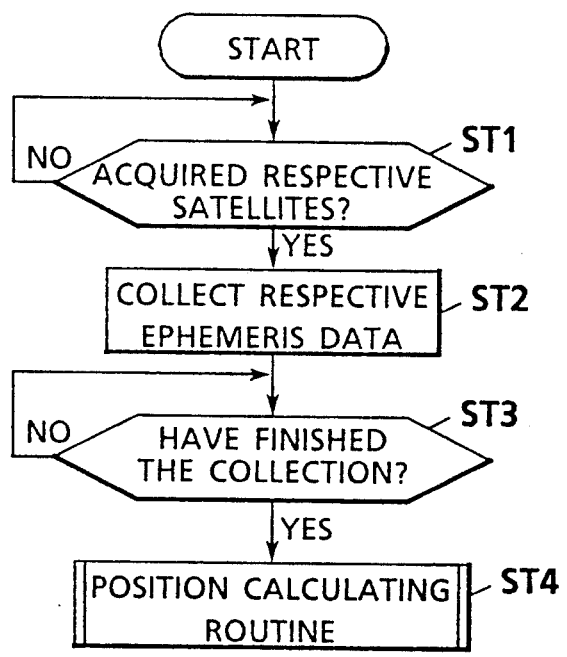
FIG. 1 is a flowchart illustrating operational steps to be performed by a conventional GPS receiver.
Figure 2:
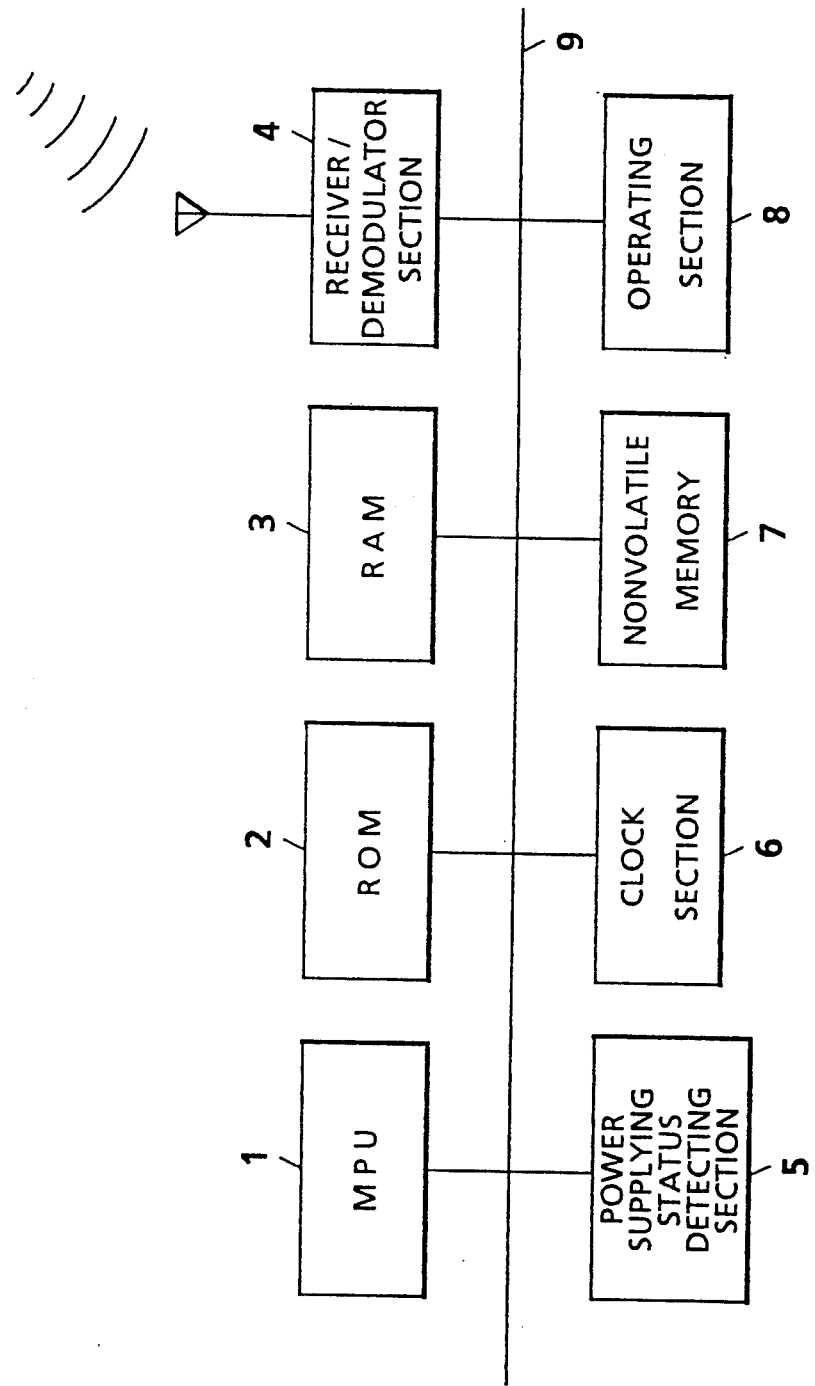
FIG. 2 is a block diagram of a GPS receiver embodying the present invention.

FIG. 2 is a block diagram showing the architecture of the GPS receiver of the present invention. A block 1 designates a microprocessor unit (MPU) to implement required various functions by making use of a random access memory (RAM) 3 as a work area in accordance with a system program stored in a read-only memory (ROM) 2.

The GPS receiver is operated under the control of a microcomputer consisting of the MPU 1 through RAM 3.

A block 4 designates a receiver/demodulator section for deriving clock data, ephemeris data, almanac data and the like therefrom by receiving and demodulating satellite signals from GPS satellites, as is well known in the art.

A block 5 designates a power supplying status detecting section for outputting a power-on signal by detecting the power-on of the GPS receiver or a power-off signal by detecting the power-off condition of the GPS receiver. The power supplying status detecting section 5 discriminates the power supplying status as a "power-on" condition when a power source voltage increases at or above a predetermined voltage while a "power-off" condition when the power source voltage decreases less than the predetermined voltage.

Further in FIG. 2, a block 6 designates a clock section (a digital clock section), a block 7 designates a rewritable nonvolatile memory for storing the time when the last ephemeris data is obtained before turning off the power and respective ephemeris data at that time.

A block 8 designates an operating unit provided with ten keys, function keys, a touch panel and the like for entering required inputs to the GPS receiver.

A line 9 designates a system bus being connected with the MPU 1 through the operating unit 8.

In addition to the above, there are provided several units (unillustrated) such as an interface unit for taking out present position data from the GPS receiver and the like.

Further the principle of the processing method and fundamental structure of the GPS receiver are well known in the art and will not be discussed in more detail.

Figure 3:
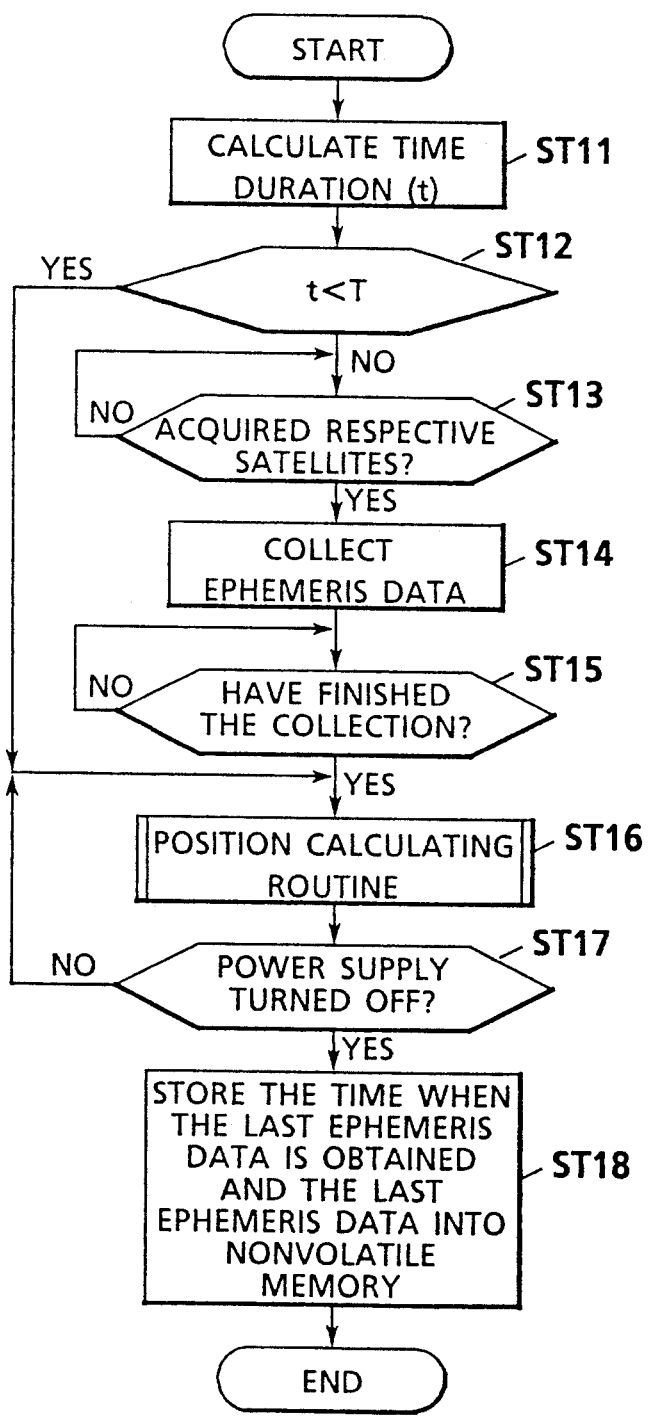
FIG. 3 is a flowchart illustrating operational steps to be performed by the GPS receiver of FIG. 2.

Now referring to FIG. 3, there is shown a flow-chart for illustrating operational steps ST11–ST18 to be implemented by the MPU and associated units of the GPS receiver.

In operation, upon initiation of the GPS receiver, the MPU performs a first step ST11 of measuring a time duration t from time data stored in the nonvolatile memory 7 (the time when the last ephemeris data is obtained in the previous operation) to a time measured at the clock section 6. It is then determined at step ST12 whether or not the time duration t is less than the predetermined period of time (for example, 120 minutes). If it is determined at step ST12 that the time duration t is more than the predetermined period of time T, it is determined at step ST13 whether or not the respective satellite is acquired. If it is, step 14 obtains respective ephemeris data from every GPS satellite in contact, whereas if it is not, step ST13 is repeated. It is then checked at step ST15 whether or not all the ephemeris data has been collected. If it have not, step ST15 is repeated, whereas if it have, the program goes to step ST16. If it is determined at step ST12 that the time duration t is less than the predetermined period of time T, the program goes to step ST16. Step ST16 constitutes a position calculating routine and calculates the position of the user station based on respective ephemeris data obtained at step ST14 or respective ephemeris data stored in the nonvolatile memory 7.

Step ST17 determines whether or not the power is turned off at the completion of every position calculation at the position calculating routine (step ST16) based on an output of the power supplying status detector 5. If it is not, the program returns to step ST16, whereas if it is, Step ST18 stores the time when the last ephemeris data is obtained and respective ephemeris data obtained in the last place.

As described above, in accordance with this invention, since the position calculation is initiated based on the respective ephemeris data stored in the nonvolatile memory 7 without re-collecting respective ephemeris data at the time when the power supply is turned off for a short period of time, there will be no loss in time for the initiation of position calculation, thus improving the operability.

As alluded to in the operational discussion, the position of the user station can be calculated expeditiously by embodying the present invention to a vehicle navigation system. It is also very convenient for a vehicle to install the GPS receiver of the present invention therein for calculating the present position with no delay after the intermission of power supply.

In the embodiment described above, it has been discussed with the operational step wherein the time to store the respective ephemeris data into the nonvolatile memory 7 is selected to be a time when the last ephemeris data is obtained. However, it should be noted that this operational step is not only limited to such implementation but to a different type of implementation so as to select the time to be a time measured at the clock section 6 when the power is turned off.

It is apparent for those skilled in the art that the power supply to the clock section 6 is maintained at all times even if the power to the GPS receiver is turned off. Accordingly, the nonvolatile memory 7 may be substituted by a conventional memory with battery back-up supported by the same power source as that of the clock section 6 during a power outage.

Further in another modification, a timer in the MPU 1 may also be used for measuring time instead of providing the discrete clock section 6 described above.

It will be apparent from the foregoing description and drawings that further modification may be made without departing from the spirit and scope of the present invention. Accordingly, the present invention is not to be considered to be limited to the specific embodiment illustrated, except insofar as may be required by the following claims.

What is claimed is:

1. A GPS receiver for positioning for use with a plurality of satellites, comprising:

a power supply for powering said GPS receiver;

means for detecting a state of said power supply to derive a power-on signal therefrom when the power supply has a voltage no less than a predetermined value and a power-off signal therefrom when the power supply has a voltage less than said predetermined value;

means, coupled to said detecting means, for measuring time;

means for storing data;

means, coupled to said time measuring means, for controlling said storing means upon receiving the power-off signal from said detecting means such that said storing means stores either a time measured by the time measuring means or a time when the last ephemeris data is obtained and said last obtained ephemeris data; and means for calculating a position based on ephemeris data upon receiving the power-on signal from said detecting means, wherein a time duration is calculated from the time measured by said time measuring means and the time stored in the storing means, and wherein respective ephemeris data stored in the storing means is used for a position calculation when the calculated time duration is shorter than a predetermined time period while respective ephemeris data newly obtained from respective satellites is used for said position calculation when the calculated time duration is no less than the predetermined time period, said position calculation by said calculating means being initiated based on said ephemeris data stored in said storing means.

2. A GPS receiver for positioning as defined in claim 1, wherein said time measuring means comprises a clock built into said control means.

3. A GPS receiver for positioning as defined in claim 1, wherein said time measuring means comprises a timer, said timer being positioned in said calculating means.

4. A GPS receiver for positioning as defined in claim 1, wherein said storing means comprises a nonvolatile memory.

5. A GPS receiver for positioning as defined in claim 1, wherein said storing means comprises a battery back-up memory.

6. A GPS receiver for positoning as defined in claim 1, further including means for entering desired inputs into said control means.

* * * * *